(12) United States Patent
Jokinen et al.

(10) Patent No.: US 8,396,072 B2
(45) Date of Patent: Mar. 12, 2013

(54) METHOD AND APPARATUS FOR CHANNEL TRAFFIC CONGESTION AVOIDANCE IN A MOBILE COMMUNICATION SYSTEM

(75) Inventors: Harri A. Jokinen, Pertteli (FI); David Navratil, Helsinki (FI); Simon P. Davis, Romsey (GB)

(73) Assignee: Renesas Mobile Corporation, Tokyo (JP)

( * ) Notice: Subject to any disclaimer, the term of this patent is extended or adjusted under 35 U.S.C. 154(b) by 264 days.

(21) Appl. No.: 13/031,355

(22) Filed: Feb. 21, 2011

(65) Prior Publication Data
US 2012/0213071 A1 Aug. 23, 2012

(51) Int. Cl.
*H04L 12/413* (2006.01)

(52) U.S. Cl. .................. 370/445; 370/230; 370/328

(58) Field of Classification Search .................. 370/230, 370/328, 445
See application file for complete search history.

(56) References Cited

U.S. PATENT DOCUMENTS

| | | |
|---|---|---|
| 2005/0271000 A1 | 12/2005 | Schulist |
| 2007/0047580 A1 | 3/2007 | Sachs et al. |
| 2010/0135210 A1 | 6/2010 | Kim et al. |
| 2010/0227616 A1 | 9/2010 | Hanov |
| 2011/0189972 A1 | 8/2011 | Sato et al. |
| 2011/0242977 A1 | 10/2011 | Tooyama et al. |
| 2011/0305224 A1 | 12/2011 | Lin |
| 2011/0317777 A1 | 12/2011 | Huang et al. |

FOREIGN PATENT DOCUMENTS

| | | | |
|---|---|---|---|
| WO | WO 2004/043099 A2 | 5/2004 | |
| WO | WO 2011/032420 A1 | 3/2011 | |

*Primary Examiner* — Jason Mattis
(74) *Attorney, Agent, or Firm* — Stanton IP Law

(57) ABSTRACT

An apparatus, comprising at least one processor configured to receive and read a series of blocks on a first channel and determine whether there is congestion and if not transmitting a channel request on a second channel.

21 Claims, 4 Drawing Sheets

METHOD AND APPARATUS FOR CHANNEL TRAFFIC CONGESTION AVOIDANCE IN A MOBILE COMMUNICATION SYSTEM

FIELD

The invention relates to mobile communications networks, and in particular to channel traffic congestion detection and management in a mobile communication system.

BACKGROUND

In mobile communication systems a cell is managed by a base station, BS. Any communication traffic in or out of or within the cell is routed via the BS. The communication is usually sent along a number of channels, each channel assigned to control or data traffic of a particular kind. One example being the Broadcast Control Channel, BCCH, used by a BS to provide a mobile node or Mobile Station, MS, in the cell with control information. Other examples being the Common Control Channel, CCCH, compromising of paging, random access, access grant and notification channels used for control signaling during connection establishment.

At times when many MSs are trying to communicate at the same time in a cell, the control or data traffic can become higher than the BS is capable of handling and the data channels that are used then become congested. In practice this means that some of mobile station's (MSs) traffic will not be handled in a timely manner. Congestion may occur on uplink channels (RACH) or on downlink channels.

To enable devices to communicate freely even under heavy data or control traffic a protocol has been developed wherein a MS has to require a data channel access before starting to communicate. In a system such as the GERAN (GSM EDGE Radio Access Network, GSM—Global System for Mobile communication, EDGE—Enhanced Data rates for GSM Evolution) mobile stations have to send a CHANNEL REQUEST message or an EGPRS CHANNEL REQUEST message on a channel named RACH (Radio Access Channel). If the BS is able to handle the communication a message is sent out granting access on a channel named AGCH (Access Granted CHannel). If the BS is not able to handle the communication a message rejecting the access is sent out on the same channel. The BS may fail to correctly receive the RACH message e.g. if simultaneous RACH messages collide or if the radio link quality is not sufficient. In this case no response is sent to the mobile station at all. Should such a response not be received a MS would resend the request over the RACH. However, during congestions these requests only lead to increased control traffic and therefore adds to the congestion. It should be noted that congestion may occur on either of an upload channel and a download channel or both.

Therefore, it would be beneficial to control the access requests so as not to burden the base stations unnecessarily and thereby alleviate the congestion in a cell.

A procedure during which the MS requests resources for control or data traffic is commonly known as the random access procedure. The MS initiates the random access procedure by transmitting a request message. When the MS sends a request message such as a CHANNEL REQUEST message or an EGPRS CHANNEL REQUEST message on a channel named RACH, the MS is expecting to receive a response from the BS within a given time derived from broadcast parameters. The MS is not allowed to retransmit the request sooner than this time. The reason why the BS does not respond to the request message may be one of the following. Firstly, the request message was not received correctly due to the congestion on a channel named RACH or due to poor link conditions. Secondly, the BS cannot send the response within the time constraints due to the congestion on a channel named AGCH. The random access procedure is delayed in either case by the waiting time between the retransmissions of the request messages.

Therefore, it would be beneficial to estimate the cause of delay in the BS response and allow for shorter waiting time between the retransmissions of the request messages (i.e. faster random access procedure) if the estimation suggests the cause of the delay is an incorrect reception of the request message due to poor link conditions.

SUMMARY

According to an aspect, an apparatus is disclosed, comprising at least one controller configured to receive and read a series of blocks on a first channel and determine whether there is congestion and if not, transmitting a channel request on a second channel. In one embodiment, the apparatus is a mobile handset. In one embodiment, the apparatus is a chip or chipset (e.g. an integrated circuit or a programmed processor).

In one embodiment to be used in a GERAN system the first channel is the ACCESS GRANTED CHANNEL, AGCH, and the second channel is the REQUEST ACCESS CHANNEL, RACH.

According to a further aspect, a method is disclosed comprising reading a series of blocks on a first channel and determining whether there is congestion, and if so, waiting, and if not, transmitting a channel request on a second channel.

According to a further aspect, a radio network node such as a base station is disclosed, said base station comprising at least one processor configured to broadcast a waiting time.

According to a further aspect, a radio network node such as a base station is disclosed, said base station comprising at least one processor configured to set a congestion flag based on a queue length on a first channel and include it in an assignment message to be transmitted.

According to a further aspect, a mobile communication system is disclosed comprising a base station and/or an apparatus according to above.

According to a further aspect, a computer program is disclosed comprising code adapted to cause the following when executed on a data-processing system reading a series of blocks on a first channel and determining whether there is congestion and if so waiting and if not transmitting a channel request on a second channel.

According to a further aspect, an apparatus is disclosed, comprising at least one controller configured to transmit a channel request on a second channel and to receive and read a series of blocks on a first channel to determine whether there is congestion and if not retransmitting a channel request on a second channel. In one embodiment, the apparatus is a mobile handset. In one embodiment, the apparatus is a chipset (e.g. an integrated circuit or a programmed processor).

In one embodiment, the computer program is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

In one embodiment, the computer program product is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

It should be noted that congestion may occur on either of an upload channel and a download channel or on both or on a channel for both upload and down-load and the teachings herein apply equally to these different arrangements.

The embodiments described hereinbefore may be used in any combination with each other. Several of the embodiments may be combined together to form a further embodiment. A method, a system, an apparatus, a computer program or a computer program product to which the invention is related may comprise at least one of the embodiments described hereinbefore.

The benefits of the teachings herein are related to reducing congestion on data traffic channels by enabling user equipment to monitor the traffic on the channels and only make requests when there is no congestion.

A further benefit is that priority is given to some devices either requiring lower priority devices to adhere to the processes described herein or by giving lower priority devices longer waiting times.

An even further benefit is that user equipment may be dynamically informed of the congestion status by a base station or other network component.

BRIEF DESCRIPTION OF THE DRAWINGS

The accompanying drawings, which are included to provide a further understanding and constitute a part of this specification, illustrate embodiments and together with the description help to explain the principles. In the drawings.

DETAILED DESCRIPTION OF THE EMBODIMENTS

Reference will now be made in detail to the embodiments of the present invention, examples of which are illustrated in the accompanying drawings.

Figure 1A:
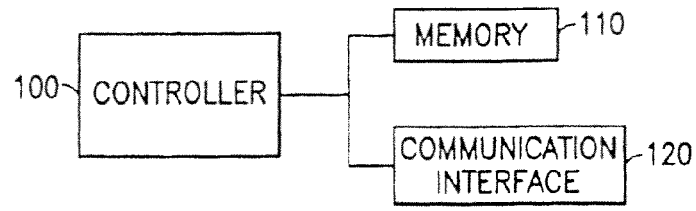
FIG. 1a is a block diagram illustrating an apparatus according an embodiment according to the teachings herein.

FIG. 1a is a block diagram illustrating an apparatus according to an embodiment. The apparatus comprises at least one controller 100, such as a processor, a memory 110 and a communication interface 120. In one embodiment the apparatus is a computer chip. In the memory 110 computer instructions are stored which are adapted to be executed on the processor 110. The communication interface 120 is adapted to receive and send information to and from the processor 100.

Figure 1B:
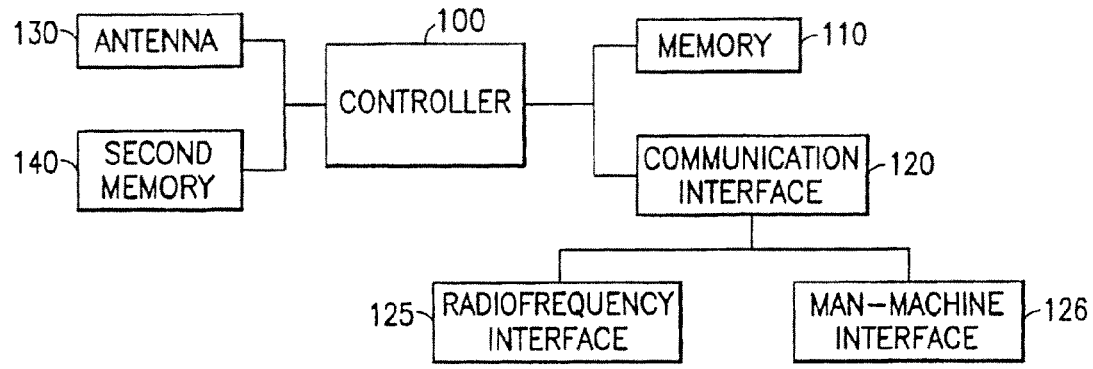
FIG. 1b is a block diagram illustrating an apparatus according an embodiment according to the teachings herein.

FIG. 1b is a block diagram illustrating an apparatus according to an embodiment. In one embodiment the apparatus is a mobile station. The apparatus comprises at least one controller 100, such as a processor, a memory 110 and a communication interface 120. In the memory 110 computer instructions are stored which are adapted to be executed on the processor 110. The communication interface 120 is adapted to receive and send information to and from the processor 100. The communication interface 120 further comprises a radio frequency interface 125 for communicating between apparatuses and a man-machine interface (MMI) 126 for communicating between the apparatus and a user. Such an MMI may include a touch pad, a display, a keypad, audio in and output and/or a touch display as are known (not shown). The mobile station further comprises an antenna 130 and a second memory 140 that comprises user applications such as a message handling application, a voice call handling application, a text editor, an internet browser application and drivers for further devices to be connected to or incorporated in the apparatus, such as a camera module for example. In one embodiment memories 110 and 140 are incorporated within the same memory module.

In one embodiment the apparatus is, for example, a mobile node, user equipment, cellular phone, a mobile terminal, an Application Specific Integrated Circuit (ASIC), an Integrated Chip (IC) or any chip. FIG. 1a is an example embodiment of an ASIC. FIG. 1b is an example embodiment of a mobile phone.

In one embodiment an apparatus according to above is adapted to be part of a radio network. The network may be a GSM-Edge Radio Access Network (GERAN). The network may also be any cellular radio access network such as, for example, an E-UTRAN or a UMTS Terrestrial Radio Access Network (UTRAN). Such a system comprises a number of base stations each handling a cell. At least one User Equipment, UE, is part of a cell and being handled by the cell's base station. A UE may be mobile and is thus able to move between cells. In one embodiment a UE is an apparatus according to above.

FIG. 2 shows a series of flow charts each according to an embodiment of the teachings herein.

Figure 2A:
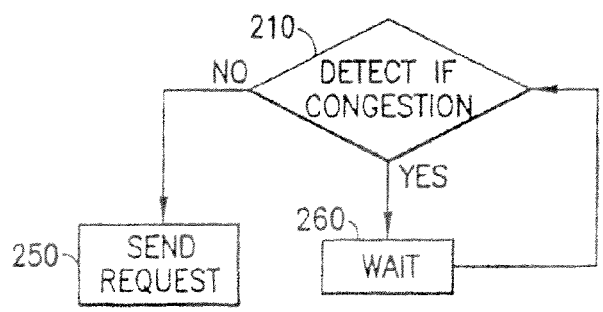
FIG. 2a is a flowchart according to an embodiment of a method discussed herein.

In one embodiment, FIG. 2a, a MS detects if there is congestion 210. If there is no congestion the MS proceeds with sending a CHANNEL REQUEST message or an EGPRS PACKET CHANNEL REQUEST message on a Request Access CHannel, RACH 250. If there is congestion the MS waits 260 and then again detects if there is congestion 210.

In one embodiment an apparatus is configured to determine if a network node, such as a base station, BS, has received a request message, an RACH message, from a mobile station and if such a message is received then the controller is configured to apply a random delay or waiting time before repeating the RACH transmission.

In one embodiment, an apparatus is configured to determine if a network node, such as a base station, BS, has received a request message, an RACH message, from a mobile station and if such a message is not received then the controller is configured to apply a shorter random delay or waiting time before repeating the RACH transmission.

In one embodiment, an apparatus is configured to determine a network node, such as a base station, BS, has received a request message, an RACH message, from a mobile station if congestion is detected.

This avoids unnecessary delays when there is no congestion.

In the following reference will be made to FIGS. 1 and 2 simultaneously as the apparatus of FIG. 1 is adapted to execute the method of FIG. 2.

Figure 2C:
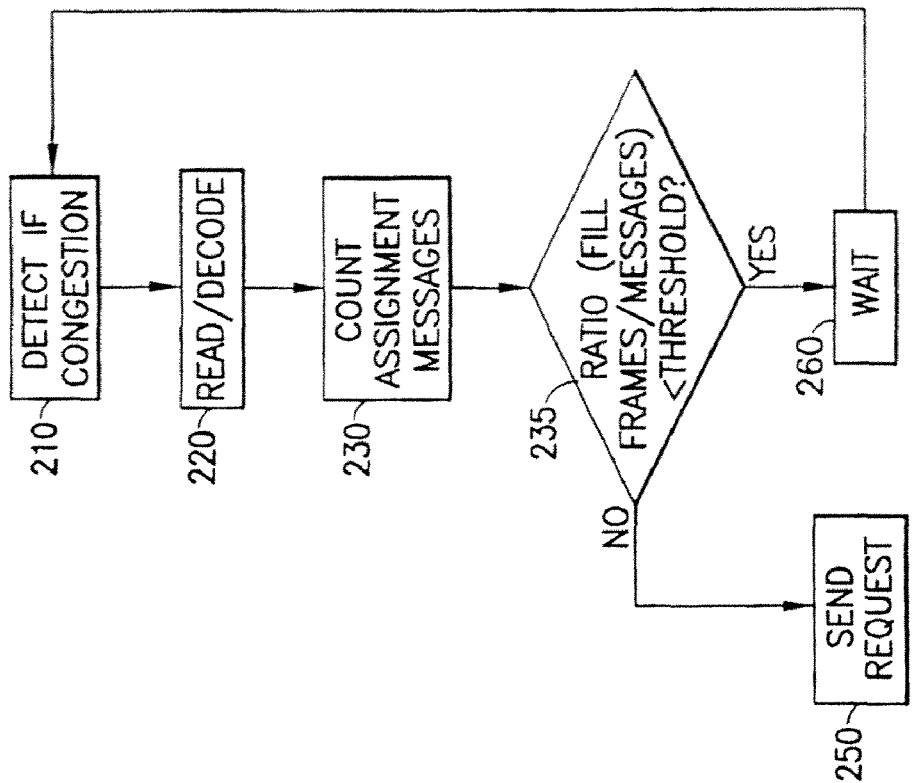
FIG. 2c is a flowchart according to an embodiment of a method discussed herein.
Figure 2B:
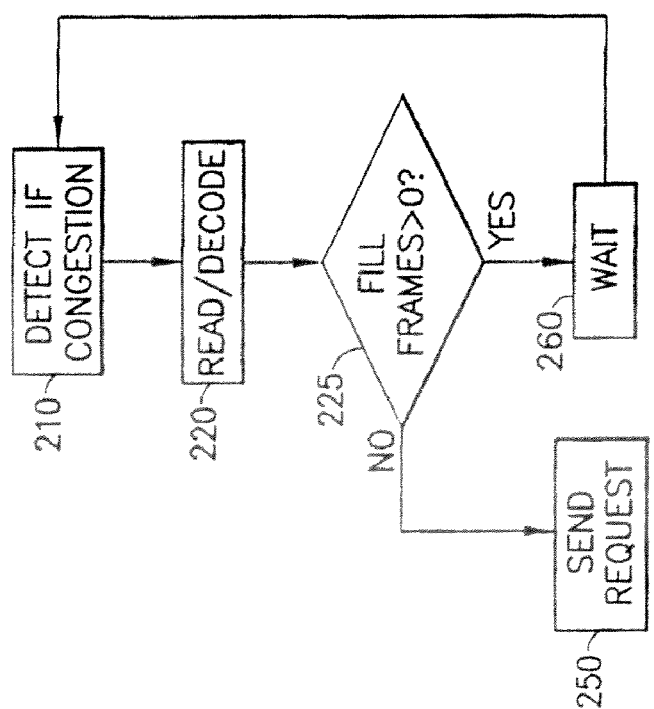
FIG. 2b is a flowchart according to an embodiment of a method discussed herein.

In one embodiment, see FIG. 2b, the controller 100 of an apparatus is configured to detect that there is congestion 210 by receiving through the communication interface 120 a series of blocks 220 that have been transmitted on a channel, such as the AGCH. In a system such as a GERAN system it is possible to detect whether there is congestion by monitoring the AGCH channel as if there is not enough traffic to fully utilize the capacity of the BS the BS will transmit blocks with L2 fill frames.

In one embodiment the processor therefore reads or decodes the blocks 220 being transmitted and counts the number of L2 fill frames 225. If the number of fill frames is 0 (zero) there is congestion.

In one embodiment the series of blocks has a length of N and in one embodiment N is 3. In one embodiment N is in the range of 2 to 4. In one embodiment N is 5. In one embodiment N is 10. In one embodiment N is in the range 3 to 15. In such an embodiment the controller 100 is free to perform other tasks when there is congestion after having decoded the N blocks. It should be noted that longer series provide for a more accurate determination of the congestion, but also take longer time to decode. A tradeoff of which feature to focus on is left to a system designer.

In one embodiment the series of blocks does not have a specified length, but the controller is configured to read blocks until a L2 fill frame is detected. This enables the processor to start transmitting the channel request as soon as it is detected that there is no congestion, but it may also lead to that the controller is busy reading many blocks unnecessarily if there is congestion, i.e. the processor 100 keeps decoding until the congestion is dissolved. In such an embodiment the box with reference 260 in FIG. 2 is not needed.

In one embodiment, see FIG. 2c, the controller 100 is further configured to count 230 the number of assignment messages such as IMMEDIATE ASSIGNMENT messages and IMMEDIATE ASSIGNMENT REJECT messages that are decoded or read in the series of blocks having been read 220. In this embodiment the controller is configured to determine a ratio between the L2 fill frames and the IMMEDIATE ASSIGNMENT messages and IMMEDIATE ASSIGNMENT REJECT messages 235. If this ratio is below a threshold value T then there is no congestion.

In one embodiment the threshold value T is 1:9. In one embodiment the threshold value T is 1:3. In one embodiment the threshold value T is 2:5. In one embodiment the threshold value is in the range of 1 to 3.

In one embodiment the IMMEDIATE ASSIGNMENT messages and/or IMMEDIATE ASSIGNMENT REJECT messages comprises a congestion flag (a 1 bit logical marker) which is set (the bit is set to 1 in one embodiment) by a base station if there is congestion and not set (the bit is set to 0 in one embodiment) if there is no congestion.

Figure 2E:
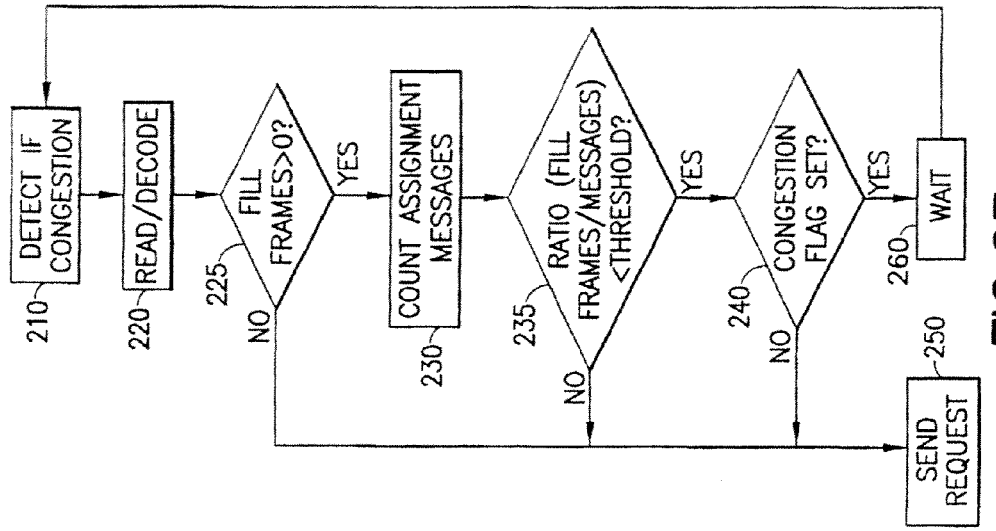
FIG. 2e is a flowchart according to an embodiment of a method discussed herein.
Figure 2D:
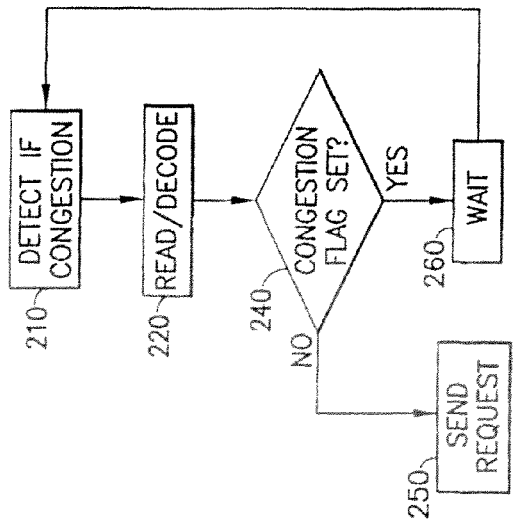
FIG. 2d is a flowchart according to an embodiment of a method discussed herein.

In one such embodiment, see FIG. 2d the controller is adapted to read a series of blocks 220 and determine 240 if a block is decoded to contain a congestion flag which is set there is congestion and if a block is decoded to contain a congestion flag which is not set there is no congestion.

In one embodiment the series of blocks has a length of N and in one embodiment N is 3. In one embodiment N is in the range of 2 to 4. In one embodiment N is 5. In one embodiment N is 10. In one embodiment N is in the range 3 to 15. In such an embodiment the controller 100 is free to perform other tasks when there is congestion after having decoded the N blocks.

In one embodiment the series of blocks does not have a specified length, but the controller is configured to read blocks until a not set congestion flag is detected. This enables the processor to start transmitting the channel request as soon as it is detected that there is no congestion, but it may also lead to that the controller is busy reading many blocks unnecessarily if there is no congestion, i.e. the processor 100 keeps decoding until the not set congestion bit is received.

In one such an embodiment having a congestion flag the apparatus is enabled to be dynamically informed of the congestion status by a network node such as a base station or other network component.

In one such embodiment a network node such as a base station or other network component is configured to set the congestion flag based on the current queue length for the AGCH.

In one such embodiment a network node such as a base station or other network component is configured to set the congestion flag more accurately based on implementation specific criteria that include other factors such as the packet utilization.

In one embodiment a controller 100 is configured to determine the waiting time based on the number of channels and/or their availability.

In one embodiment a controller 100 is configured to employ a statistical analysis of the channel usage to predict when congestion is about to arise and/or to dissolve to determine a waiting time.

In one such embodiment a network node such as a base station or other network component is configured to set the congestion flag more accurately based on a combination of implementation specific criteria that includes other factors such as the packet channel utilization and the current queue length for the AGCH.

In one such embodiment the process of checking for congestion may be run in the background and an apparatus therefore does not need to make a congestion check each time a channel is to be requested as the apparatus is kept aware of the congestion status by the base station. In one embodiment a copy of the congestion flag is stored in the memory 110 of the apparatus for quick and easy reference.

FIG. 2e shows a combination of the embodiments above as has been described with reference to FIGS. 1, 2a, 2b, 2c, and 2d.

In one embodiment the controller 100 is configured to wait between attempts to determine whether there is congestion or not.

FIG. 2a shows a flowchart where a controller 100 is configured to wait 260 for a pre-determined time WT until making another attempt. The time to wait WT may be standard specific. If the time to wait WT is set to zero (0) the controller 100 is configured to continuously read blocks until it is detected that there is no congestion.

Figure 2G:
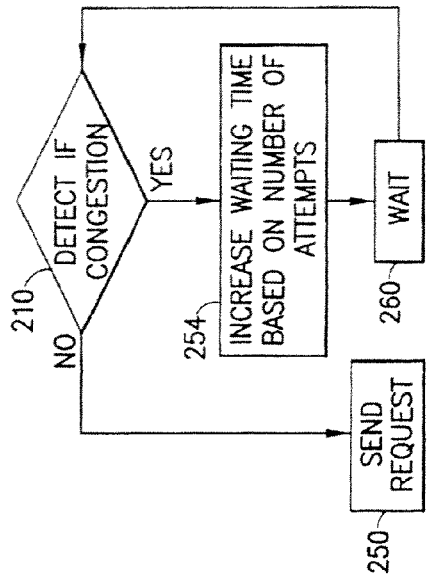
FIG. 2g is a flowchart according to an embodiment of a method discussed herein.
Figure 2I:
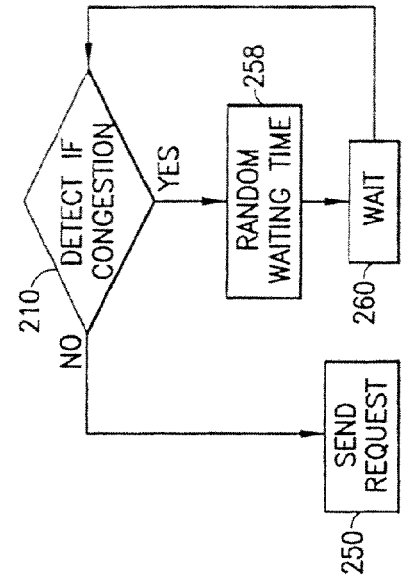
FIG. 2i is a flowchart according to an embodiment of a method discussed herein.
Figure 2F:
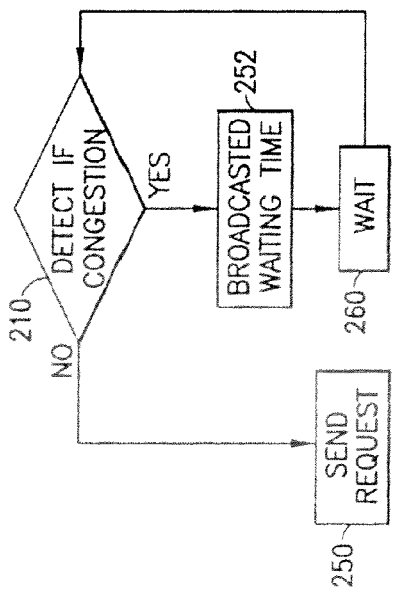
FIG. 2f is a flowchart according to an embodiment of a method discussed herein.

In one embodiment see FIG. 2f, the controller 100 is configured to listen to a broad cast channel, such as a Broadcast Control CHannel, BCCH, on which a base station is transmitting for a waiting time WT 252. In such an embodiment a base station is configured to broadcast a waiting time WT. This enables a base station to control how long different MSs are to wait and thus allow the base station to both control the traffic on the channels (reducing unnecessary attempts) and ordering a further priority scheme among devices (lower priority devices get longer waiting times).

In one embodiment the controller 100 is configured to determine a waiting time WT based on other broadcast parameters related to non-congested behavior such as time between request retransmission and maximum allowed number of retransmissions In one embodiment see FIG. 2g, the controller 100 is configured to increase the waiting time WT with the number of times that a detection of congestion has been made 254. In one embodiment the waiting time increases linearly with the number of attempts, for example through a formula such as:

$$WT=\text{number of attempts}*\text{Constant}.$$

In one embodiment the controller 100 is configured to base the waiting time on a geometric series.

In one embodiment the waiting time increases non-linearly with the number of attempts, for example through a formula such as:

$$WT=\text{Constant}^{\text{number of attempts}}.$$

Figure 2H:
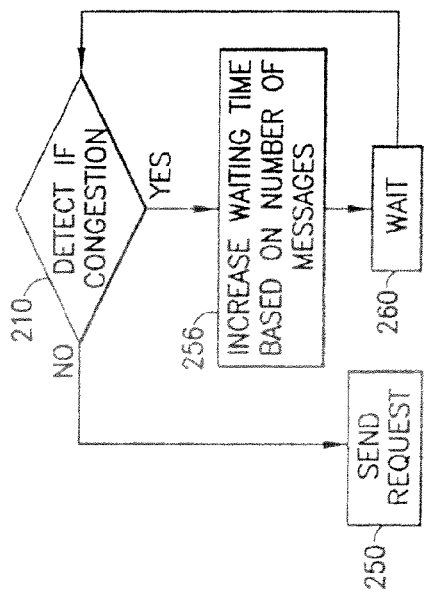
FIG. 2h is a flowchart according to an embodiment of a method discussed herein.

In one embodiment see FIG. 2h, the controller 100 is configured to increase the waiting time WT with the number of IMMEDIATE ASSIGNMENT and/or IMMEDIATE ASSIGNMENT REJECT messages received 256. In one embodiment the waiting time increases linearly with the number of messages received, for example through a formula such as:

$$WT=\text{number of messages}*\text{Constant}.$$

In one embodiment the controller 100 is configured to base the waiting time on a geometric series.

In one embodiment see FIG. 2i, the controller 100 is configured to set the waiting time WT to a random number 258. This improves the synchronization of many UEs simultaneously waiting for congestion to disappear or a new congestion might occur should all waiting UEs send their requests at the same time.

It should be noted that the random element may be added in all embodiments described above. For example, the formula for the waiting time of FIG. 2g becomes $$WT=\text{number of attempts}*\text{Constant}+\text{Random}$$

or $$WT=\text{number of attempts}*\text{Constant}*\text{Random}.$$

In one embodiment the random element is taken from a range that grows with the number of attempts and/or messages. For example the random element could be taken from the range [constant1, constant2*nbr of attempts].

It should be noted that in the embodiments above the waiting time is proportionate to one or more parameters of the system, wherein it should be noted that the waiting time is not necessarily directly proportionate to the parameters.

The embodiments described hereinbefore in association with FIGS. 1 and 2 may be used in any combination with each other. Several of the embodiments may be combined together to form a further embodiment.

The exemplary embodiments can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The embodiments described hereinbefore in association with FIGS. 1 and 2 may be used in any combination with each other. Several of the embodiments may be combined together to form a further embodiments.

It is obvious to a person skilled in the art that with the advancement of technology, the basic idea may be implemented in various ways. The invention and its embodiments are thus not limited to the examples described above; instead they may vary within the scope of the claims.

The invention claimed is:

1. An apparatus for use in controlling congestion in a cell of a communications network, the apparatus comprising:
   at least one controller and a memory storing a computer program which are configured to:
      receive and read a series of blocks on a first channel;
      determine whether there is congestion based on whether said series of blocks comprises a flag indicating that there is congestion, wherein the flag is in at least one of an IMMEDIATE ASSIGNMENT message or an IMMEDIATE ASSIGNMENT REJECT message; and
      in the event that the determination is that there is no congestion, initiate an access procedure by transmitting a channel request on a second channel.

2. The apparatus according to claim 1, wherein the series of blocks has a predetermined length (N).

3. The apparatus according to claim 1, the controller with the memory and the computer program being further configured to wait for a waiting time before performing another attempt to determine whether there is congestion or not.

4. The apparatus according to claim 3, wherein the waiting time is proportionate to the number of attempts to determine whether there is congestion or not.

5. The apparatus according to claim 3, wherein the waiting time includes a random element.

6. The apparatus according to claim 3, wherein the controller with the memory and the computer program are further arranged to receive the waiting time from a network node.

7. The apparatus according to claim 6, wherein the waiting time is based on at least one implementation specific criterion.

8. The apparatus according to claim 1, wherein the first channel is an access grant channel and the second channel is a random access channel.

9. The apparatus according to claim 1, wherein the apparatus comprises a mobile station.

10. A method of controlling congestion in a cell of a communications network, the method comprising:
    reading a series of blocks on a first channel;
    determining whether there is congestion based on whether said series of blocks comprises a flag indicating that there is congestion, wherein the flag is in at least one of an IMMEDIATE ASSIGNMENT message or an IMMEDIATE ASSIGNMENT REJECT message;
    if the determination is that there is congestion, waiting; and
    if the determination is that there is no congestion, initiating an access procedure by transmitting a channel request on a second channel.

11. A method according to claim 10, wherein the method comprises if the determination is that there is congestion, waiting for a waiting time before performing another attempt to determine whether there is congestion or not.

12. The method according to claim 10, wherein the first channel is an access grant channel and the second channel is a random access channel.

13. The method according to claim 10, wherein the series of blocks has a predetermined length (N).

14. The method according to claim 11, wherein the waiting time is proportionate to the number of attempts to determine whether there is congestion or not.

15. The method according to claim 11, wherein the waiting time is received from a network node by a mobile station performing the method.

16. A memory storing a computer program comprising a set of instructions, which, when executed on a data-processing system, causes the data processing system to
    read a series of blocks on a first channel;
    determine whether there is congestion based on whether said series of blocks corn irises a flag indicating that there is congestion wherein the flag is in at least one of an IMMEDIATE ASSIGNMENT message or an IMMEDIATE ASSIGNMENT REJECT message; and
    in the event that the determination is that there is no congestion, to initiate an access procedure by transmitting a channel request on a second channel.

17. The memory according to claim 16, wherein the first channel is an access granted channel and the second channel is a random access channel.

18. The memory according to claim 16, wherein the series of blocks has a predetermined length (N).

19. The memory according to claim 16, wherein the set of instructions, when executed on a data-processing system, further causes the data processing system to wait for a waiting time before performing another attempt to determine whether there is congestion or not.

20. The memory according to claim 19, wherein the waiting time is proportionate to the number of attempts to determine whether there is congestion or not.

21. The memory according to claim 19, wherein the waiting time is received from a network node by a mobile station comprising the memory and data processing system.

* * * * *

UNITED STATES PATENT AND TRADEMARK OFFICE
CERTIFICATE OF CORRECTION

PATENT NO. : 8,396,072 B2
APPLICATION NO. : 13/031355
DATED : March 12, 2013
INVENTOR(S) : Harri A. Jokinen et al.

It is certified that error appears in the above-identified patent and that said Letters Patent is hereby corrected as shown below:

In the Claims:

Claim 16 at col. 10, line 23; "to" should read --to:--

Claim 16 at col. 10, line 26; "corn irises" should read --comprises--

Claim 16 at col. 10, line 27; "congestion" should read --congestion,--

Signed and Sealed this
Twenty-eighth Day of May, 2013

Teresa Stanek Rea
*Acting Director of the United States Patent and Trademark Office*